Jan. 14, 1936. C. L. SHERWOOD 2,027,558
ATTACHMENT FOR FRUIT CLEANING APPARATUS
Filed May 31, 1934
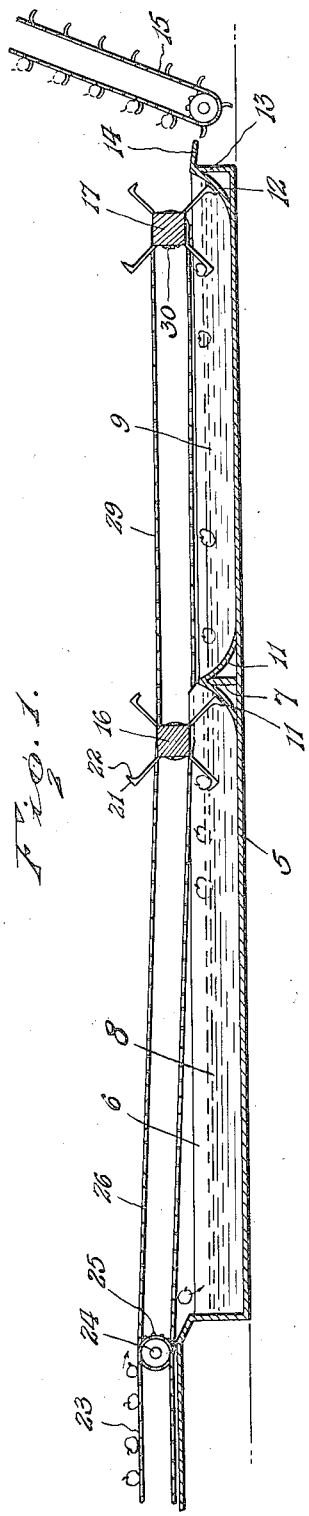
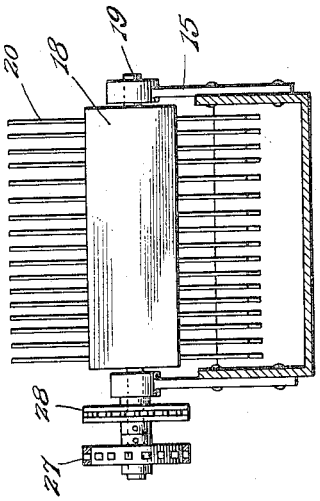
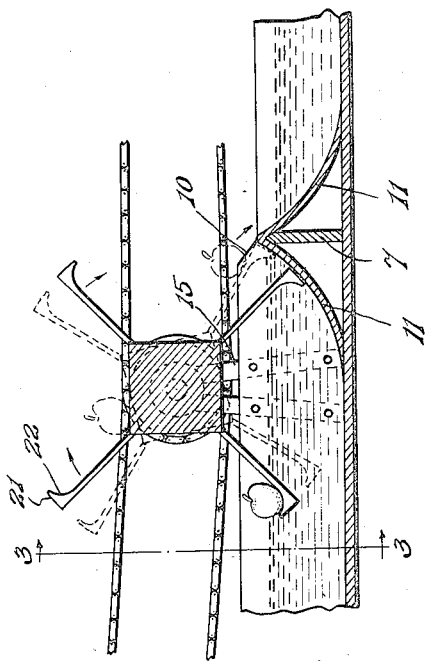
Inventor
C. L. Sherwood.
By Lacy & Lacy, Attorneys Patented Jan. 14, 1936

2,027,558

UNITED STATES PATENT OFFICE 2,027,558

ATTACHMENT FOR FRUIT CLEANING APPARATUS

Charles L. Sherwood, Twin Falls, Idaho

Application May 31, 1934, Serial No. 728,419

1 Claim. (Cl. 146—195)

This invention relates to fruit cleaning apparatus and more particularly to novel means for transferring fruit from an acid bath to a fresh water bath during the cleaning operation and for removing the fruit from said fresh water bath after the cleaning thereof has been effected.

The laws of most of the fruit-growing States of the West are mandatory in the requirement that insecticides and similar fruit-spraying compounds containing lead or other deleterious materials be thoroughly removed from apples and other fruit before marketing the fruit. This has generally been accomplished by immersing the fruit in an acid bath to dissolve the residue of lead and subsequently washing the fruit in fresh water to remove the acid residue.

The revolving drums usually employed for transferring the fruit from one bath to the other, however, are open to serious objections in that they are mounted to rotate counter-clockwise with the result that the fruit is often crushed or bruised by impact with the drum transferring arms and bottom of the liquid trough and the rotation of said arms tends to kick or transfer some of the acid solution into the fresh water trough, thus contaminating the fresh water, as well as causing a serious waste of expensive acid solution.

The object of the present invention is to overcome these objectionable features and to provide a fruit cleaning apparatus of simple and inexpensive construction by means of which floating apples or other fruit in the acid bath are picked up and carried over the drum instead of under and delivered into the fresh water trough without crushing, bruising or otherwise mutilating the fruit, the construction of the device being such that any of the acid solution picked up by the arms of the drum will drain back into the acid bath and thus prevent contamination of the fresh water in the rinsing trough.

A further object of the invention is to provide a fruit cleaning apparatus including revolving drums mounted for rotation in a clockwise direction and provided with radiating arms, the ends of which are curved laterally to form terminal cups which pick up and receive the apples or other fruit and transfer said fruit over the drum from one bath to another.

A still further object of the invention is generally to improve this class of devices so as to increase their utility, durability and efficiency.

In the accompanying drawing, forming a part of this specification, and in which similar numerals of reference indicate corresponding parts in all the figures of the drawing:

Figure 1 is a longitudinal sectional view of a fruit cleaning apparatus embodying the present invention.

Figure 2 is an enlarged vertical sectional view of one of the fruit transferring drums and its associated parts.

Figure 3 is a transverse sectional view taken on the line 3—3 of Figure 2.

The improved fruit cleaning apparatus, forming the subject-matter of the present invention, comprises a longitudinally disposed trough having a bottom 5 and side walls 6, said trough being provided with a transverse partition 7 defining spaced compartments 8 and 9, one of which is adapted to contain an acid solution or bath and the other fresh water for removing the acid residue and cleansing the fruit. The side walls of the compartment 8 are preferably higher than the side walls of the compartment 9, and the upper edges of the side walls of the compartment 8 are preferably inclined downwardly and merge into the upper edges of the side walls of the compartment 9, as indicated at 10 in Figure 2 of the drawing. Disposed on opposite sides of the partition 7 are downwardly curved end walls 11 which may be formed of metal or other suitable material and these curved end walls 11 gradually merge into the bottom 5 of the trough so as not to offer any surface obstructions. A similar curved end wall 12 extends between the bottom of the compartment 9 and the end wall 13 thereof, and extending from said end wall is an inclined plate or chute 14 for delivering the cleaned fruit to a suitable conveyor, indicated at 15. Secured to the opposite side walls of the compartments 8 and 9, adjacent the curved end walls 11 and 12, are upstanding brackets 15 and journaled in the upper ends of said brackets are rotating drums 16 and 17. Each drum comprises a hub 18, preferably rectangular in cross section, and having its opposite ends reduced to form trunnions 19 which fit in the bearings in the adjacent brackets 15 so as to permit free rotation of the drums within the trough. Extending radially from the hubs 18 and secured thereto, preferably at the intersection of the side walls thereof, are a plurality of elevating arms 20 arranged sufficiently close together to prevent an apple from passing therebetween, and the outer ends of these arms extend laterally at 21 and are dished on their inner faces to form terminal cups 22 which pick up and receive the apples or other fruit when the drums are rotated, and serve to transfer the fruit from one compartment to another.

Arranged near the rear end of the trough is an endless conveyer 23 which receives the fruit and delivers said fruit into an acid solution in the compartment 8, and mounted on the shaft 24 of said conveyer is a sprocket wheel 25 over which is trained a sprocket chain 26 which engages a sprocket wheel 27 mounted on one of the trunnions of the hub 18 of the drum 16 so that motion will be transmitted from the conveyor to the drum 16 to rotate the same. A second sprocket wheel 28 is secured on the trunnion of the hub 18 of this drum and fitted around said sprocket wheel is a sprocket chain or belt 29 which engages a corresponding sprocket wheel 30 carried by the rotary drum 17 so that the drums 16 and 17 rotate clockwise and in unison.

In operation, apples or other fruit are delivered into the acid solution in the compartment 8 by means of the conveyor 23 and this acid solution serves to dissolve the residue of lead contained in the insecticide with which the fruit has been previously sprayed. The apples will float in the acid solution and as they approach the rotary drum 16 the arms 20 thereof will pick up the apples and carry them up and over the drum and deposit said apples in the fresh water bath in the compartment 9. As the apples are elevated by the drum, they will roll towards the hub 18 and be bodily carried by the drum into the compartment 9 thereby preventing crushing, bruising or otherwise injuring the fruit which would otherwise occur should the apples be forced under the drum, as heretofore, instead of being movable with and carried over said drum. The clockwise movement of the drum also prevents the acid solution in the compartment 8 from being kicked or forced into the fresh water bath and contaminating the same as any of the acid solution which may adhere to and be elevated by the arms 20 will drain back into the compartment 8, and as this acid solution is comparatively expensive, a material saving in the acid is also effected. As the apples or other fruit are delivered by the drum 16 into the fresh water bath in the compartment 9, said apples will float in the direction of the drum 17, and as they approach said drum, the apples will be elevated by the arms of the drum and deposited on the inclined chute 14 where they will be received by the conveyor 15 and delivered to any suitable point. If desired, however, the conveyor 15 may be omitted and the cleaned apples discharged directly into a basket or other receptacle designed to receive the same. The fresh water bath serves to wash the apples and remove any of the acid solution therefrom, so that when the apples emerge from the discharge end of the trough, they will be perfectly clean and sanitary in every respect and thus meet all requirements of the law. Attention is called to the fact that as the hubs 18 are angular in cross section, the flat faces thereof will receive and support the apples during rotation of the drums, and as the curved terminals of the arms 20 successively register with the partition 7, the apples will slide downwardly on said arms and be deposited in the fresh water bath, as best shown in Figure 2 of the drawing, so that liability of the apples being crushed or bruised is reduced to a minimum.

It will, of course, be understood that the device may be made in different sizes and shapes and provided with any desired number of liquid compartments and fruit transferring drums without departing from the spirit of the invention. It will also be understood that, if desired, the conveyor 23 may be omitted and the apples or other fruit deposited directly into the acid solution compartment, the essential feature of the invention residing in the construction of the rotary drums whereby the transfer of fruit from one liquid compartment to the other may be effected without in any manner bruising or otherwise injuring the fruit.

Having thus described the invention, I claim:

In a fruit cleaning apparatus, a trough adapted to receive fruit and provided with a transverse partition defining independent compartments one of which is adapted to receive an acid solution and the other fresh water, said partition having sloping faces curved downwardly in opposite directions and merged into the bottom of the trough, a drum rotatably mounted adjacent the partition and spaced therefrom above the acid solution compartment and provided with a plurality of spaced radial arms, each arm being straight throughout substantially its entire length and at its free end terminating in a hooked portion disposed in a direction to extend toward the bottom of the acid bath compartment when the free end of the arm is presented toward a sloping side face of the partition, means for rotating the drum in a direction to move the arms downwardly across the sloping face of the partition toward the bottom of the acid bath compartment and then away from the partition and upwardly with the hooks at their free ends presented upward to hold fruit upon the arms and effect lifting of the fruit from the acid bath, the path of movement of the drum and said arms being substantially to the side of the partition over the acid compartment to allow the acid solution to drain into the acid compartment and then present the arms at a downward incline toward the upper edge of the partition whereby the fruit may roll along the arms and over the partition into the water compartment.

CHARLES L. SHERWOOD.